United States Patent
Choi

(10) Patent No.: US 10,100,716 B2
(45) Date of Patent: Oct. 16, 2018

(54) ENGINE HAVING INTEGRATED HEAT EXCHANGER

(71) Applicant: HYUNDAI MOTOR COMPANY, Seoul (KR)

(72) Inventor: Won Rok Choi, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 99 days.

(21) Appl. No.: 15/266,557

(22) Filed: Sep. 15, 2016

(65) Prior Publication Data

US 2017/0268414 A1    Sep. 21, 2017

(30) Foreign Application Priority Data

Mar. 16, 2016  (KR) .................... 10-2016-0031657

(51) Int. Cl.
| | |
|---|---|
| F02B 29/04 | (2006.01) |
| F02F 1/26 | (2006.01) |
| F02M 26/32 | (2016.01) |
| F02M 26/02 | (2016.01) |
| F02M 26/30 | (2016.01) |
| F02B 37/00 | (2006.01) |
| F02F 1/42 | (2006.01) |
| F02F 1/40 | (2006.01) |

(Continued)

(52) U.S. Cl.
CPC ...... *F02B 29/0475* (2013.01); *F02B 29/0462* (2013.01); *F02B 37/00* (2013.01); *F02F 1/26* (2013.01); *F02F 1/40* (2013.01); *F02F 1/42* (2013.01); *F02M 26/02* (2016.02); *F02M 26/20* (2016.02); *F02M 26/30* (2016.02); *F02M 26/32* (2016.02); *F02M 26/44* (2016.02); *Y02T 10/144* (2013.01); *Y02T 10/146* (2013.01)

(58) Field of Classification Search
CPC .. F02B 29/0475; F02B 29/0462; F02B 37/00; F02M 26/32; F02M 26/30; F02M 26/02; F02F 1/42; F02F 1/26
USPC ............................................. 60/605.1, 605.2
See application file for complete search history.

(56) References Cited

U.S. PATENT DOCUMENTS

| | | | | |
|---|---|---|---|---|
| 4,644,926 | A * | 2/1987 | Sakurai | F02B 19/165 123/254 |
| 2014/0102427 | A1* | 4/2014 | Korenaga | F02B 37/025 123/568.12 |
| 2016/0169166 | A1* | 6/2016 | Choi | F02M 26/32 123/568.12 |

FOREIGN PATENT DOCUMENTS

| | | |
|---|---|---|
| KR | 10-2000-0047594 A | 7/2000 |
| KR | 10-2013-0008088 A | 1/2013 |
| KR | 10-2015-0069941 A | 6/2015 |

(Continued)

*Primary Examiner* — Hoang Nguyen
(74) *Attorney, Agent, or Firm* — McDermott Will & Emery LLP

(57) ABSTRACT

An engine having an integrated heat exchanger includes a cylinder head defining combustion chambers; an intercooler embedded at an intake side in the cylinder head and cooling intake gas by using a coolant; an EGR cooler embedded in the cylinder head and cooling exhaust gas, which is discharged from an exhaust side of the combustion chambers and recirculates to the intake side of the combustion chambers through an EGR passageway formed in the cylinder head; and an EGR distribution tube formed at an upper side in the cylinder head, supplied with the exhaust gas passing through the EGR cooler, and having distribution holes through which the exhaust gas is distributed into intake ports connected with the combustion chambers.

10 Claims, 4 Drawing Sheets

(51) Int. Cl.
    *F02M 26/20*     (2016.01)
    *F02M 26/44*     (2016.01)

(56) References Cited

FOREIGN PATENT DOCUMENTS

| | | |
|---|---|---|
| KR | 10-2015-0075421 A | 7/2015 |
| KR | 10-2016-0007885 A | 1/2016 |

* cited by examiner

ENGINE HAVING INTEGRATED HEAT EXCHANGER

CROSS-REFERENCE TO RELATED APPLICATION

This application claims the benefit of priority to Korean Patent Application No. 10-2016-0031657 filed in the Korean Intellectual Property Office on Mar. 16, 2016, the entire content of which is incorporated herein by reference.

TECHNICAL FIELD

The present disclosure relates to an internal combustion engine, and more particularly, to an engine having an integrated heat exchanger, in which both an intercooler and an exhaust gas recirculation (EGR) cooler are embedded in a cylinder head such that cooling efficiency is improved and the entire structure becomes compact.

BACKGROUND

In general, a diesel engine is provided with a supercharger or an intercooler in order to obtain a higher output.

In the diesel engine having the supercharger as described above, exhaust gas or outside air is compressed by a compressor of the supercharger, and the compressed exhaust gas or the compressed air is supplied to the engine.

However, the rapidly compressed air absorbs heat of the supercharger and heat generated during the process of compressing the air, such that density of the air decreases. As a result, charging efficiency in a cylinder of the engine deteriorates.

For this reason, the intercooler is used to cool the air, that is, supercharged air, to increase air density and to allow a larger amount of air to be drawn into the cylinder of the engine. Accordingly, it is possible to obtain higher output.

Furthermore, an exhaust gas recirculation (EGR) system is mounted in the diesel engine in order to reduce emission of nitrogen oxide (NOx) that is one of air pollutants.

The nitrogen oxide is deleterious gas generated when oxygen and nitrogen are combined under a high-pressure and high-temperature condition. In order to inhibit the generation of the nitrogen oxide, the EGR system lowers a combustion temperature by supplying an intake system with a part of exhaust gas discharged into the atmosphere and reduces the generation of the nitrogen oxide by reducing the amount of oxygen to be supplied.

The EGR system needs to recirculate high-temperature exhaust gas, and as a result, the EGR system may be provided with an EGR cooler to cool the EGR system. As the EGR cooler, there are a high-pressure EGR cooler (HP-EGR cooler) which is connected to an EGR valve at a side of an exhaust manifold and directly cools high-pressure EGR gas flowing to the intake manifold, and a low-pressure EGR cooler (LP-EGR cooler) which cools low-pressure EGR gas with a pressure lowered while the gas sequentially passes through a turbine of the supercharger, a catalyst converter and the like.

Recently, a water-cooled intercooler, which makes an intake route short, is applied to the engine system in order to improve cooling efficiency and responsiveness. In particular, researches have been conducted to simplify a complicated cooling circuit connected to the intercooler and the EGR cooler, make the entire structure compact, and improve intake efficiency by preventing gas passing through the intercooler and the EGR cooler from being heated before the gas is supplied to a combustion chamber.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide an engine having an integrated heat exchanger, which is capable of improving intake efficiency by installing both an intercooler and an exhaust gas recirculation (EGR) cooler in a cylinder head, omitting a complicated cooling circuit for cooling the cylinder head, making the entire structure compact, and preventing intake gas passing through the intercooler and recirculating exhaust gas passing through the EGR cooler from being heated.

According to an exemplary embodiment in the present disclosure, an engine having an integrated heat exchanger includes a cylinder head which defines combustion chambers; an intercooler which is embedded at an intake side in the cylinder head and disposed to cool intake gas to be supplied to the combustion chambers by using a coolant; and an exhaust gas recirculation (EGR) cooler which is embedded in the cylinder head and disposed to cool exhaust gas that is discharged from an exhaust side of the combustion chambers and recirculates to the intake side of the combustion chambers through an EGR passageway formed in the cylinder head.

A mixing space may be formed between the intercooler and the combustion chamber, and the air passing through the intercooler and the recirculating exhaust gas passing through the EGR cooler may be mixed in the mixing space and supplied to the combustion chamber.

The engine may further include an EGR distribution tube which is formed at an upper side of the mixing space in the cylinder head, in which the EGR distribution tube is supplied with the recirculating exhaust gas passing through the EGR cooler and distributes the recirculating exhaust gas into the mixing space.

Distribution holes may be formed to connect the EGR distribution tube and the mixing space.

The combustion chambers may be arranged at predetermined intervals in a longitudinal direction of the cylinder head, and the distribution holes may be formed at positions, respectively, that correspond to intake ports of the combustion chambers.

The EGR cooler may be disposed in the cylinder head at one side of the intercooler in a longitudinal direction of the cylinder head.

The EGR cooler may be disposed in the cylinder head at an upper side of the intercooler.

The EGR cooler may be embedded in the cylinder head so as to cool the recirculating exhaust gas by using an engine coolant for cooling the cylinder head.

The intercooler may be embedded in the cylinder head so as to cool air by using a low-temperature coolant that is formed separately from the engine coolant for cooling the cylinder head and passes through a low-temperature coolant line.

In the low-temperature coolant line, a low-temperature coolant radiator, which discharges heat of the low-temperature coolant to the outside, and a low-temperature coolant pump, which circulates the low-temperature coolant along the low-temperature coolant line, may be disposed at predetermined positions.

A turbocharger, which compresses air and supplies the compressed air to the intercooler, may be disposed in an intake line at an upstream side of the intercooler.

According to another exemplary embodiment in the present disclosure, an engine having an integrated heat exchanger includes a cylinder head which defines combustion chambers; an intercooler which is embedded at an intake side in the cylinder head and disposed to cool intake gas to be supplied to the combustion chambers by using a coolant; an EGR cooler which is embedded in the cylinder head and disposed to cool exhaust gas that is discharged from an exhaust side of the combustion chambers and recirculates to the intake side of the combustion chambers through an EGR passageway formed in the cylinder head; and an EGR distribution tube which is formed at an upper side in the cylinder head, supplied with the recirculating exhaust gas passing through the EGR cooler, and formed with distribution holes through which the recirculating exhaust gas is distributed into intake ports connected with the combustion chambers.

The EGR cooler may cool the recirculating exhaust gas by using an engine coolant for cooling the cylinder head, and the intercooler may cool the intake gas by using a low-temperature coolant that is formed separately from the engine coolant and passes through a low-temperature coolant line.

According to the present disclosure for achieving the aforementioned object, since the EGR cooler and the intercooler are embedded in the cylinder head, a route through which the intake gas passing through the intercooler is supplied to the combustion chambers may be shortened, and a temperature of the intake gas may be maintained to be low such that intake efficiency may be improved.

Furthermore, since the engine coolant passing through the cylinder head cools the EGR cooler, a route of a cooling line is omitted, and cooling efficiency is improved, and since a length of the route of the recirculating exhaust gas passing through the EGR cooler is shortened, a temperature of the recirculating exhaust gas may be maintained to be relatively low, and intake efficiency may be improved.

DETAILED DESCRIPTION OF THE EMBODIMENTS

Figure 1:
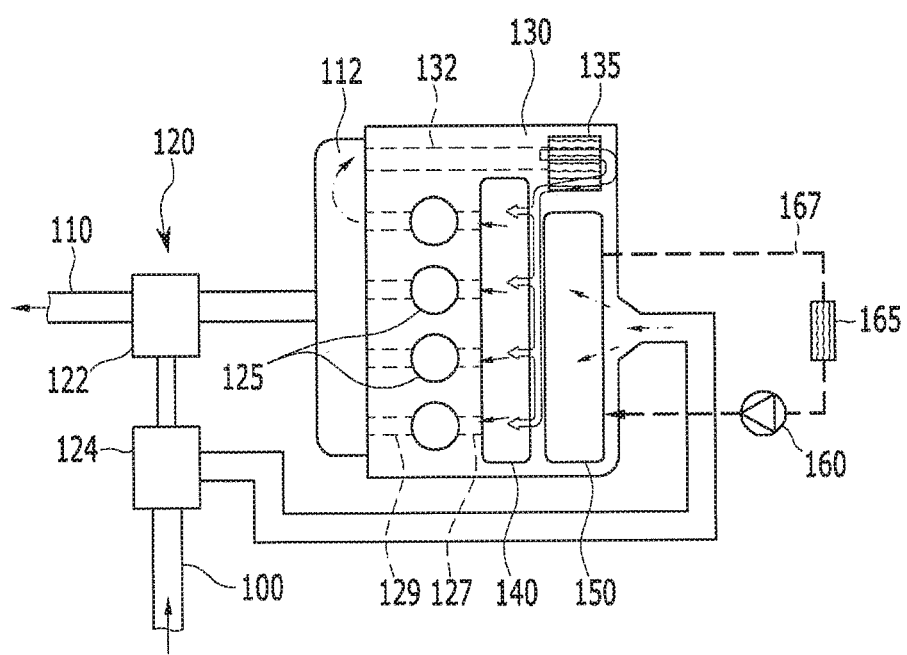
FIG. 1 is a configuration diagram of an engine having an integrated heat exchanger according to an exemplary embodiment in the present disclosure.

Hereinafter, exemplary embodiments will be described in detail with reference to the accompanying drawings.

In addition, the size and thickness of each component illustrated in the drawings are arbitrarily shown for understanding and ease of description, but the present disclosure is not limited thereto. Thicknesses of several portions and regions are enlarged for clear expressions.

Parts irrelevant to the description will be omitted to clearly describe the exemplary embodiments in the present disclosure, and the same or similar constituent elements will be designated by the same reference numerals throughout the specification.

In the following description, names of constituent elements are classified as a first . . . , a second . . . , and the like so as to discriminate the constituent elements having the same name, and the names are not essentially limited to the order.

FIG. 1 is a configuration diagram of an engine having an integrated heat exchanger according to an exemplary embodiment in the present disclosure.

Referring to FIG. 1, an engine includes an intake line 100, a turbocharger 120 having a turbine 122 and a compressor 124, a cylinder head 130, an exhaust gas recirculation (EGR) cooler 135, an intercooler 150, a mixing space 140, intake ports 127, combustion chambers 125, exhaust ports 129, an exhaust manifold 112, an exhaust line 110, an EGR passageway 132, a low-temperature coolant flow path 167, a low-temperature coolant pump 160, and a low-temperature coolant radiator 165.

Outside air supplied to the intake line 100 is compressed by the compressor 124 of the turbocharger 120 and then supplied to the cylinder head 130, and the outside air supplied to the cylinder head 130 is supplied to the combustion chambers 125 through the intercooler 150, the mixing space 140, and the intake ports 127.

Exhaust gas combusted in the combustion chamber 125 is collected in the exhaust manifold 112 through the exhaust ports 129, and then discharged to the outside through the exhaust line 110. Here, the turbine 122 installed in the exhaust line 110 is rotated by exhaust gas, and rotates the compressor 124.

A part of the exhaust gas collected in the exhaust manifold 112 flows toward the intake side through the EGR passageway 132 formed in the cylinder head 130, and then is distributed into the mixing space 140 after passing through the EGR cooler 135.

The intercooler 150 is a water-cooled type, and serves to cool high-temperature and high-pressure intake gas compressed by the compressor 124 with a low-temperature coolant recirculating along the low-temperature coolant line 167. Here, the low-temperature coolant radiator 165, which discharges heat of the low-temperature coolant to the outside, and the low-temperature coolant pump 160, which pumps and circulates the low-temperature coolant, are disposed in the low-temperature coolant line 167.

The intercooler 150 and the EGR cooler 135 are embedded in the cylinder head 130, the intercooler 150 cools the intake gas by using a separate low-temperature coolant, and the EGR cooler 135 cools the recirculating exhaust gas by using an engine coolant circulating in the cylinder head 130.

Furthermore, the intercooler 150 and the EGR cooler 135 are embedded in the cylinder head 130, and the EGR passageway 132 through which the exhaust gas recirculates from the exhaust ports 129 to the intake ports 127 is formed in the cylinder head 130.

Therefore, efficiency in cooling the recirculating exhaust gas is improved by the engine coolant circulating in the cylinder head 130, and the intake gas passing through the intercooler 150 is distributed directly into the intake ports 127, such that an increase in temperature of the intake gas is prevented, and thus, charging efficiency of the intake gas and output may be improved.

In addition, the mixing space 140 is formed between the intake port 127 and the intercooler 150, and the recirculating exhaust gas and the intake gas are mixed in the mixing space 140 and then distributed into the intake ports 127, such that mixing properties of the intake gas and the exhaust gas are improved.

In the exemplary embodiment, the cylinder head 130 may be made of aluminum, the EGR cooler 135 may also be made of aluminum, the intercooler 150 may also be made of aluminum, and the EGR cooler 135 and the intercooler 150 are separated from each other.

The EGR cooler 135 and the intercooler 150 are inserted into a mounting space in the cylinder head 130, and fixed to the cylinder head 130 by welding or by means of a fixing member. The intake gas passing through the intercooler 150 and the exhaust gas passing through the EGR cooler 135 are mixed in the mixing space 140, and the mixing space 140 guides the intake gas and the exhaust gas, so that the intake gas and the exhaust gas are distributed into the combustion chambers 125.

Furthermore, the EGR cooler 135 is vertically disposed, such that the recirculating exhaust gas flowing from the exhaust ports passes through a lower portion of the EGR cooler 135, and the recirculating exhaust gas passing through the lower portion of the EGR cooler 135 may be supplied into the mixing space 140 after passing through an upper portion of the EGR cooler 135.

Figure 2:
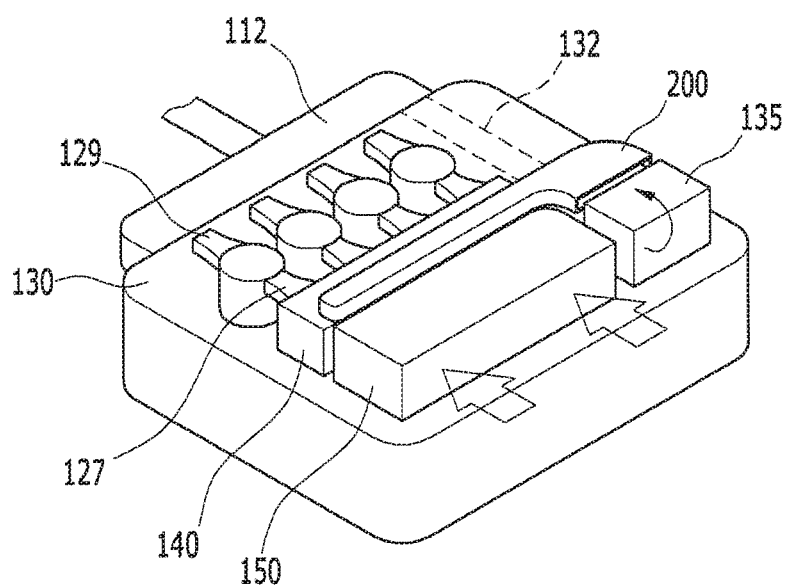
FIG. 2 is a perspective view illustrating an interior of the engine having the integrated heat exchanger according to the exemplary embodiment in the present disclosure.

FIG. 2 is a perspective view illustrating an interior of the engine having the integrated heat exchanger according to the exemplary embodiment in the present disclosure.

Referring to FIG. 2, an EGR distribution tube 200 is disposed at an upper side of the mixing space 140, and the EGR distribution tube 200 distributes the recirculating exhaust gas passing through the upper portion of the EGR cooler 135 into the mixing space 140.

The EGR cooler 135 has a double layered structure, and a first layer and a second layer thereof sequentially cool the recirculating exhaust gas after being supplied with the recirculating exhaust gas through the EGR passageway 132, and then discharge the recirculating exhaust gas into the EGR distribution tube 200.

The EGR distribution tube 200 is connected to the second (upper) layer of the EGR cooler 135 and distributes the recirculating exhaust gas to an upper side of the mixing space 140.

Figure 3:
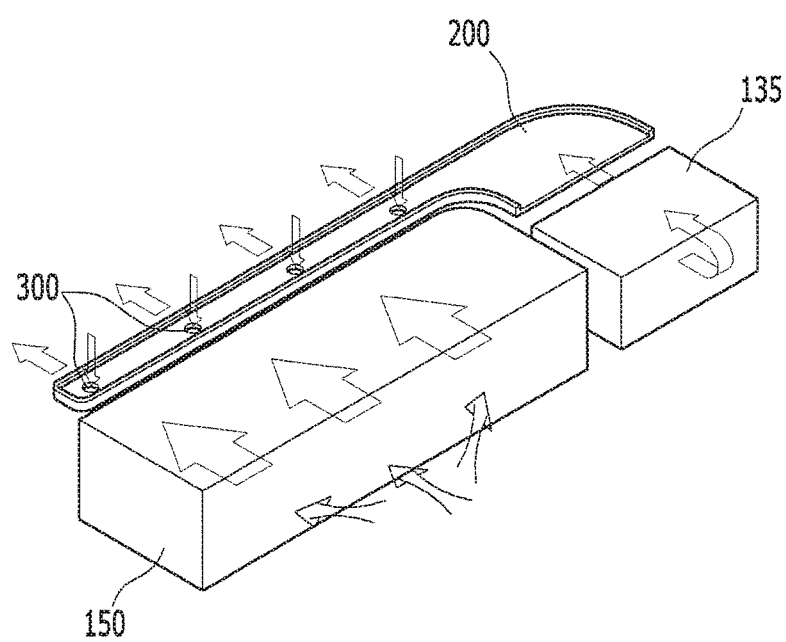
FIG. 3 is a perspective view illustrating a part of the engine having the integrated heat exchanger according to the exemplary embodiment in the present disclosure.

FIG. 3 is a perspective view illustrating a part of the engine having the integrated heat exchanger according to the exemplary embodiment in the present disclosure.

Referring to FIG. 3, distribution holes 300 are formed in the EGR distribution tube 200, and the distribution holes 300 are arranged at predetermined intervals so as to correspond to the combustion chambers 125.

In the present disclosure, the recirculating exhaust gas, which has sequentially flowed through the lower and upper portions of the EGR cooler 135, flows into the EGR distribution tube 200 disposed at the upper side of the EGR cooler 135, and the recirculating exhaust gas flowing into the EGR distribution is tube 200 is injected into the mixing space 140 through the distribution holes 300, and then mixed with the intake gas passing through the intercooler 150.

Furthermore, the distribution holes 300 are formed at positions corresponding to the intake ports 127 connected to the combustion chambers, such that mixing of the recirculating exhaust gas and the intake gas is improved. Since the EGR cooler 135 and the intercooler 150 are embedded in the cylinder head 130, a route through which the intake gas passing through the intercooler 150 is supplied to the combustion chambers 125 is shortened, and a temperature of the intake gas is maintained to be low such that intake efficiency is improved.

Furthermore, since the engine coolant passing through the cylinder head 130 cools the EGR cooler 135, a route of a cooling line is omitted, and cooling efficiency is improved, and since a length of the route of the recirculating exhaust gas passing through the EGR cooler 135 is shortened, a temperature of the recirculating exhaust gas is maintained to be relatively low, and intake efficiency does not deteriorate.

Figure 4:
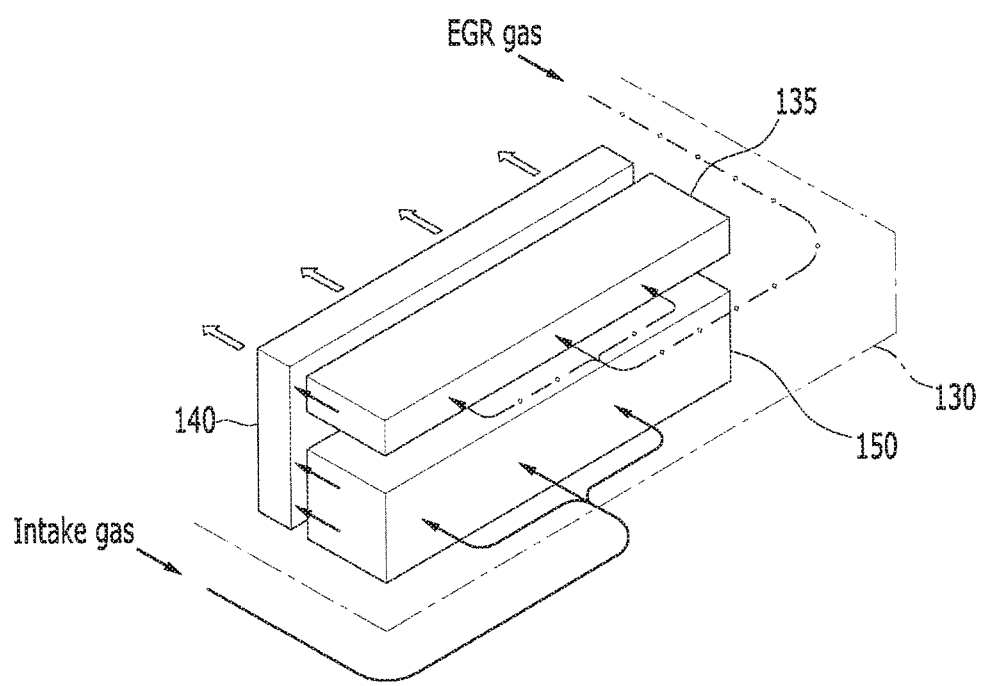
FIG. 4 is a perspective view illustrating a part of an engine having an integrated heat exchanger according to another exemplary embodiment in the present disclosure.

FIG. 4 is a perspective view illustrating a part of an engine having an integrated heat exchanger according to another exemplary embodiment in the present disclosure, and descriptions of the same or similar parts as those illustrated in FIGS. 1 to 3 will be omitted, but different features will be described in detail.

Referring to FIG. 4, the intercooler 150 and the EGR cooler 135 are embedded at the intake side of the cylinder head 130. Further, the intercooler 150 is disposed at a lower side, and the EGR cooler 135 is disposed at an upper side of the intercooler 150, thereby forming a double layered structure.

The mixing space 140 is formed at a downstream side of the intercooler 150 and the EGR cooler 135, and the mixing space 140 is connected to the intake ports 127 connected to the combustion chambers 125.

In the present disclosure, the exhaust gas discharged from the exhaust ports 129 flows through the EGR passageway 132 formed in the cylinder head 130 and then flows through the EGR cooler 135, and the recirculating exhaust gas passing through the EGR cooler 135 is distributed into the mixing space 140.

In addition, the intake gas flows through the intercooler 150 via the intake line 100, and flows into the mixing space 140 so as to be mixed with the recirculating exhaust gas passing through the EGR cooler 135. The mixed gas is distributed into the respective combustion chambers 125 through the intake ports 127.

As described above, since the EGR cooler 135 and the intercooler 150 are embedded in the cylinder head 130, a route through which the intake gas passing through the intercooler 150 is supplied to the combustion chambers 125 is shortened, and a temperature of the intake gas is maintained to be low such that intake efficiency is improved.

Since the engine coolant passing through the cylinder head 130 cools the EGR cooler 135, a route of a cooling line is omitted, and cooling efficiency is improved and a length of the route of the recirculating exhaust gas passing through the EGR cooler 135 is shortened, a temperature of the recirculating exhaust gas is maintained to be relatively low and intake efficiency does not deteriorate.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. An engine having an integrated heat exchanger, the engine comprising:
   a cylinder head defining combustion chambers;
   an intercooler embedded at an intake side in the cylinder head and cools intake gas, which is to be supplied to the combustion chambers, by using a coolant; and
   an exhaust gas recirculation (EGR) cooler embedded in the cylinder head and cooling exhaust gas, which is discharged from an exhaust side of the combustion chambers and which recirculates to the intake side of the combustion chambers through an EGR passageway formed in the cylinder head, wherein the EGR cooler is embedded in the cylinder head to cool the recirculating exhaust gas by using an engine coolant for cooling the cylinder head, and wherein the intercooler is embedded in the cylinder head to cool air by using a low-temperature coolant which flows separately from an engine coolant for cooling the cylinder head and passes through a low-temperature coolant line.

2. The engine of claim 1, further comprising:

a mixing space is formed between the intercooler and the combustion chamber, wherein air, which passes through the intercooler, and the exhaust gas, which passes through the EGR cooler, are mixed in the mixing space and supplied to the combustion chamber.

3. The engine of claim 2, further comprising:

an EGR distribution tube formed at an upper side of the mixing space in the cylinder head, wherein the EGR distribution tube is supplied with the exhaust gas passing through the EGR cooler and distributes the exhaust gas into the mixing space.

4. The engine of claim 3, wherein:

distribution holes connect the EGR distribution tube and the mixing space.

5. The engine of claim 4, wherein:

the combustion chambers are arranged at predetermined intervals in a longitudinal direction of the cylinder head, and the distribution holes are formed at positions, respectively, that correspond to intake ports of the combustion chambers.

6. The engine of claim 1, wherein:

the EGR cooler is disposed in the cylinder head at one side of the intercooler in a longitudinal direction of the cylinder head.

7. The engine of claim 1, wherein:

the EGR cooler is disposed in the cylinder head at an upper side of the intercooler.

8. The engine of claim 1, wherein on the low-temperature coolant line, a low-temperature coolant radiator, which discharges heat of the low-temperature coolant to outside, and a low-temperature coolant pump, which circulates the low-temperature coolant along the low-temperature coolant line, are disposed.

9. The engine of claim 1, wherein:

a turbocharger, which compresses air and supplies the compressed air to the intercooler, is disposed in an intake line at an upstream side of the intercooler.

10. An engine having an integrated heat exchanger, the engine comprising:

a cylinder head defining combustion chambers;

an intercooler embedded at an intake side in the cylinder head and cooling intake gas, which is to be supplied to the combustion chambers, by using a coolant;

an EGR cooler embedded in the cylinder head and cooling exhaust gas, which is discharged from an exhaust side of the combustion chambers and which recirculates to the intake side of the combustion chambers through an EGR passageway formed in the cylinder head; and an EGR distribution tube formed at an upper side in the cylinder head, supplied with the exhaust gas which passes through the EGR cooler, and having distribution holes through which the exhaust gas is distributed into intake ports that is connected with the combustion chambers, wherein the EGR cooler cools the exhaust gas by using an engine coolant for cooling the cylinder head, and wherein the intercooler cools the intake gas by using a low-temperature coolant which flows separately from the engine coolant and passes through a low-temperature coolant line.

* * * * *